US009507372B2

United States Patent
Sharifie et al.

(10) Patent No.: US 9,507,372 B2
(45) Date of Patent: Nov. 29, 2016

(54) OUT-OF-BAND SIGNAL DETECTION BY HOST INTERFACES OF STORAGE MODULES

(71) Applicants: Tal Sharifie, Lehavim (IL); Shay Benisty, Beer Sheva (IL); Simon Bass, Beer Sheva (IL)

(72) Inventors: Tal Sharifie, Lehavim (IL); Shay Benisty, Beer Sheva (IL); Simon Bass, Beer Sheva (IL)

(73) Assignee: SanDisk Technologies LLC, Plano, TX (US)

( * ) Notice: Subject to any disclaimer, the term of this patent is extended or adjusted under 35 U.S.C. 154(b) by 353 days.

(21) Appl. No.: 13/923,573

(22) Filed: Jun. 21, 2013

(65) Prior Publication Data

US 2014/0380083 A1 Dec. 25, 2014

(51) Int. Cl.
*G06F 1/04* (2006.01)
*G06F 1/06* (2006.01)
*G06F 1/32* (2006.01)
*G06F 1/14* (2006.01)

(52) U.S. Cl.
CPC ............... *G06F 1/06* (2013.01); *G06F 1/3237* (2013.01); *G06F 1/14* (2013.01); *Y02B 60/1221* (2013.01); *Y02B 60/32* (2013.01)

(58) Field of Classification Search
CPC .......................................... G06F 1/06
USPC ........................................ 713/502
See application file for complete search history.

(56) References Cited

U.S. PATENT DOCUMENTS

| | | | |
|---|---|---|---|
| 2003/0081743 A1* | 5/2003 | Chiang et al. | 379/93.08 |
| 2003/0115413 A1* | 6/2003 | Wood | G11B 19/20 711/114 |
| 2003/0158991 A1* | 8/2003 | Deyring et al. | 710/305 |
| 2005/0169356 A1* | 8/2005 | Matsumoto et al. | 375/220 |
| 2005/0254610 A1* | 11/2005 | Liu et al. | 375/354 |
| 2006/0069816 A1* | 3/2006 | Oshikawa et al. | 710/14 |
| 2006/0069933 A1 | 3/2006 | Matsuoka et al. | |
| 2007/0096837 A1* | 5/2007 | Liu | G06F 13/385 331/74 |
| 2009/0083587 A1 | 3/2009 | Ng et al. | |
| 2009/0146721 A1* | 6/2009 | Kurooka et al. | 327/306 |
| 2009/0219057 A1* | 9/2009 | Chen et al. | 327/94 |
| 2010/0169687 A1 | 7/2010 | Kimura | |

(Continued)

FOREIGN PATENT DOCUMENTS

EP 2 390 755 A1 11/2011

OTHER PUBLICATIONS

International Search Report and Written Opinion for corresponding application No. PCT/US2014/042490 mailed Sep. 10, 2014.

*Primary Examiner* — Thomas Lee
*Assistant Examiner* — Volvick Derose
(74) *Attorney, Agent, or Firm* — Brinks Gilson & Lione

(57) ABSTRACT

A host interface for a storage module may include an out-of-band (OOB) detector that is configured to detect receipt of an OOB signal using a clock signal. The clock signal may be generated by a clock generator that is activated using a counter. When an OOB signal is received, the counter may activate the clock generator. When no OOB signal is being received, the counter may wait for a predetermined time period before deactivating the clock generator.

21 Claims, 9 Drawing Sheets

(56) References Cited

U.S. PATENT DOCUMENTS

| | | |
|---|---|---|
| 2010/0250791 A1 | 9/2010 | Johnson et al. |
| 2010/0332695 A1* | 12/2010 | Fukuda ............... H04B 1/10 |
| | | 710/33 |
| 2011/0099396 A1 | 4/2011 | Sakagami |
| 2011/0194652 A1* | 8/2011 | Chiba ............. H04L 25/0292 |
| | | 375/340 |
| 2012/0191996 A1 | 7/2012 | Cheong |
| 2012/0206828 A1* | 8/2012 | Ishii et al. ................. 360/31 |
| 2012/0226927 A1 | 9/2012 | Kagan et al. |
| 2013/0251016 A1* | 9/2013 | Yap ..................... G06F 1/3209 |
| | | 375/224 |
| 2013/0335115 A1* | 12/2013 | Song ................. H03K 19/0005 |
| | | 326/30 |

* cited by examiner

OUT-OF-BAND SIGNAL DETECTION BY HOST INTERFACES OF STORAGE MODULES

BACKGROUND

Storage modules may use out-of-band (OOB) signaling when communicating with a host device. OOB signaling may be used for various reasons, such as to request communication initialization, to force a hardware reset on the storage module, or to wakeup a host interface of the storage module, for example. The host interface of the storage module may detect OOB signals when they are received from the host using clock signals. However, power saving modes of the storage module may hinder the ability of the host interface to detect the OOB signals, because during the power saving modes, clocking circuitry used to generate the clock signals may be deactivated. At the same time, always keeping clocking circuitry active during power saving modes may be undesirable, as this increases power consumption.

SUMMARY

Embodiments of the present invention are defined by the claims, and nothing in this section should be taken as a limitation on those claims. By way of example, the embodiments described in this document and illustrated in the attached drawings generally relate to a host interface for a storage module and related methods that uses a counter to activate a clock generator when out-of-band signals are being received by the host device, and to wait for a predetermined time period before deactivating the clock generator when no out-of-band signals are being received.

In one example, a host interface for a storage module may include a counter module that is configured to detect whether an out-of-band (OOB) signal is received by a physical layer of the host interface. In response to detection of a presence of the OOB signal, the counter module may be configured to activate or maintain activation of a clock generator module of the host interface. When the clock generator module is activated, the clock generator module may output a clock signal. Alternatively, in response to detection of an absence of the OOB signal, the counter module may be configured to wait for a predetermined time period before deactivating the clock generator module. The clock generator module may be configured to cease output of the clock signal when deactivated. The host interface may also include an OOB detector module that is configured to detect receipt of the OOB signal by the physical layer using the clock signal received by the clock generator module. In some configurations, the OOB counter module, the clock generator module, and the OOB detector module may be used for low power modes of operation.

In sum, a host interface may keep a clock generator active for a limited period of time while other components of the host interface may enter a low power mode in the event OOB signals are received during the predetermined period. Also, when the clock generator is deactivated, such as during the low power mode, the host interface may provide a quick startup of the clock generator so that a received OOB signal may be detected.

These and other embodiments, features, aspects and advantages of the present invention will become better understood from the description herein, appended claims, and accompanying drawings as hereafter described.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

DETAILED DESCRIPTION

Various modifications to and equivalents of the embodiments described and shown are possible and various generic principles defined herein may be applied to these and other embodiments. Thus, the claimed invention is to be accorded the widest scope consistent with the principles, features, and teachings disclosed herein.

The present description describes host interfaces for a storage module that are configured to detect out-of-band (OOB) signals using a clock signal from a clock generator that is activated and deactivated through the use of a counter. The counter may activate the clock generator when it detects a presence of an incoming OOB signal and deactivate the clock generator when it detects an absence of an incoming OOB signal. The counter may activate or maintain activation of the clock generator while the clock detector detects incoming OOB signals. Upon detection of an absence of incoming OOB signals, the counter may wait for a period of time or count to a final number before deactivating the clock generator.

The host interface may communicate OOB signals with a host for various reasons, such as to establish communication with the storage module or have the storage module perform some function, such as enter into a particular power mode, as examples. The OOB signals may be characterized and identified by burst and idle portions. A burst portion of an OOB signal may include a series of rapid oscillations. An idle portion of an OOB signal may be a portion where no oscillation occurs or signal activity is generally constant. Each burst portion and idle portion may have an associated time period over which the oscillation or inactivity occurs.

Additionally, each OOB signal may have an associated number of burst portions and/or idle portions. A particular type of OOB signal may be identified by the burst and idle portions, the time periods associated with the burst and idle portions, the numbers of the burst and idle portions, and/or combinations thereof.

For some example configurations, the host interface may communicate with the host in accordance with serial advanced technology attachment (SATA). For these configurations, OOB signals may be configured in accordance with SATA specifications and protocols. Two types of SATA OOB signals may include COMRESET and COMWAKE signals. A COMRESET signal may be used to force a hardware reset on the storage module. A COMWAKE signal may be used to signal the host interface to wake up or enter a ready power mode.

Figure 1:
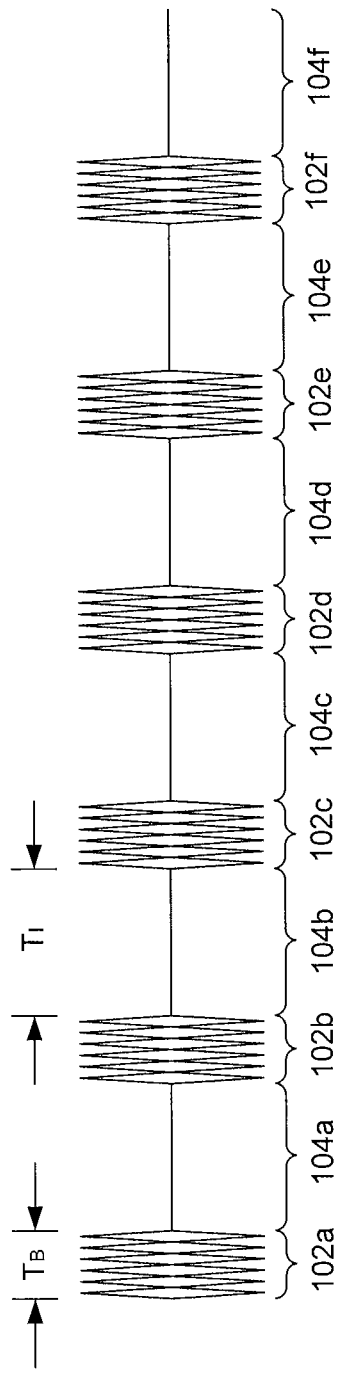
FIG. 1 is a plot of an example out-of-band signal as a function of time.
Figure 2:
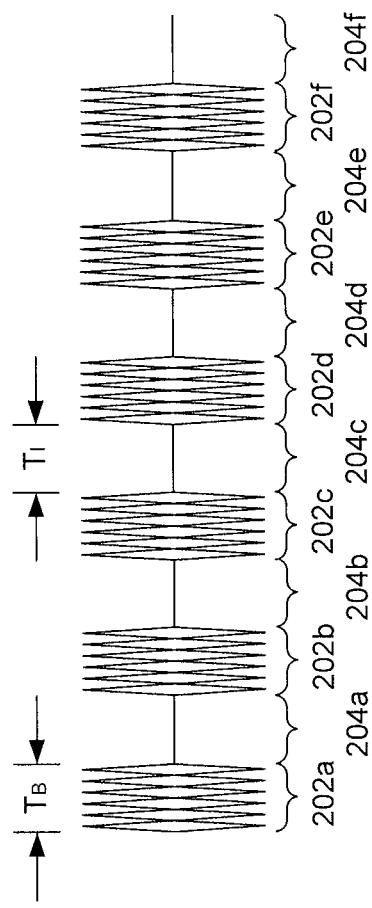
FIG. 2 is a plot of another example of an out-of-band signal as a function of time.

FIGS. 1 and 2 show plots of the COMRESET and COMWAKE signals as functions of time. For the COMRESET signal shown in FIG. 1, each burst portion 102a-f may have an associated time period or duration $T_B$ of about 106 nanoseconds (ns). In addition, each burst portion 102a-f may be followed by an idle portion 104a-f having an associated time period or duration $T_I$ of about 320 ns. Also, as shown in FIG. 1, a COMRESET signal may have six burst portions 102a-f.

For the COMWAKE signal shown in FIG. 2, each burst portion 202a-f may have an associated time period or duration $T_B$ of about 106 ns. In addition, each burst portion 202a-f may be followed by an idle portion 204a-f having an associated time period or duration $T_I$ of about 106 ns. Also, as shown in FIG. 2, a COMWAKE signal may have six burst portions 202a-f.

Figure 3:
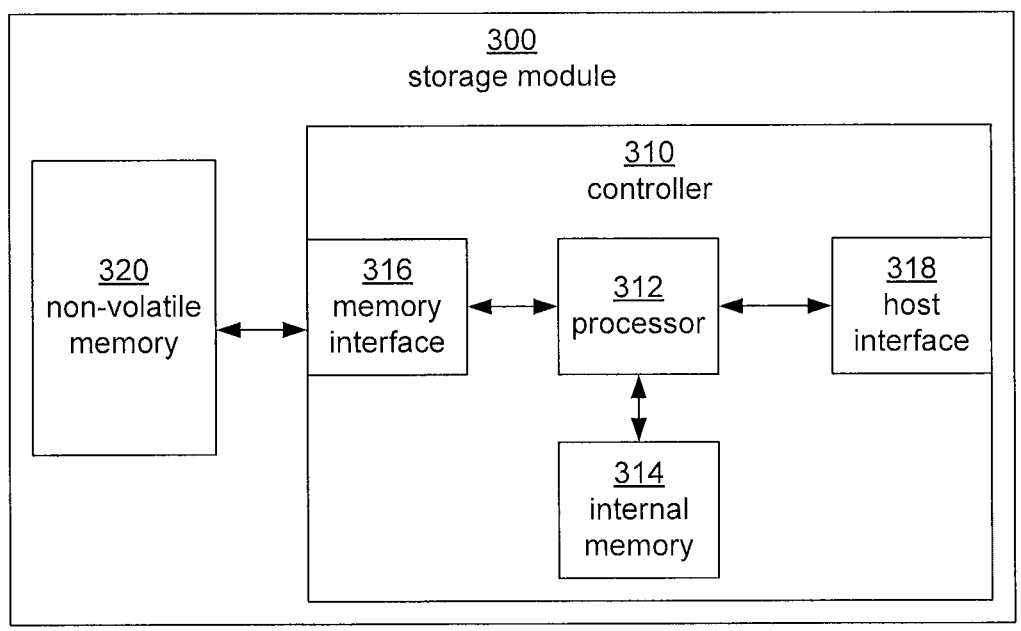
FIG. 3 is a block diagram of an example storage module.
Figure 4A:
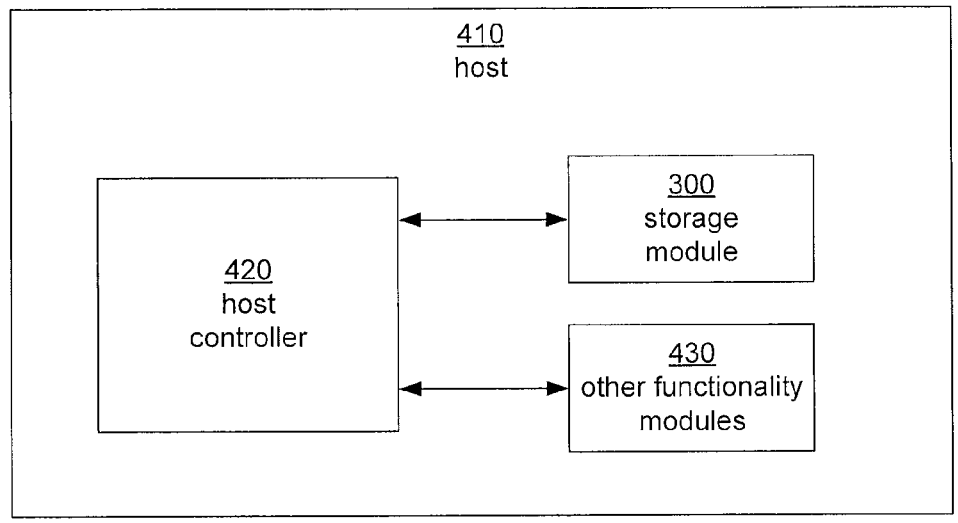
FIG. 4A is a block diagram of the storage module shown in FIG. 3 embedded in a host.
Figure 4B:
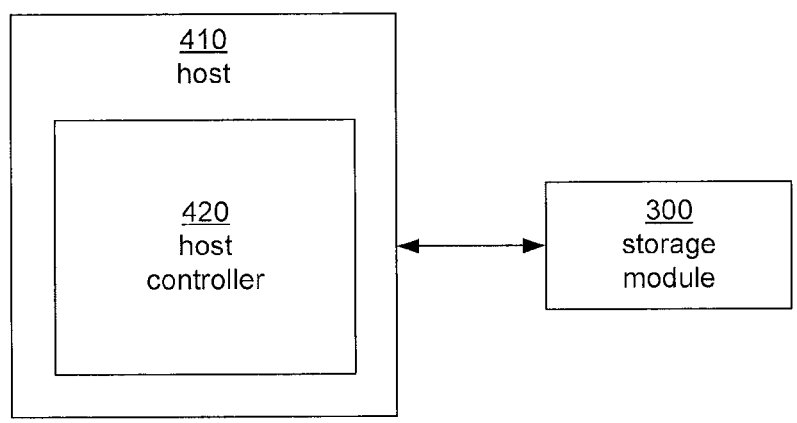
FIG. 4B is a block diagram of a storage module shown in FIG. 3 removably connected with a host.

FIGS. 3, 4A, and 4B show various example embodiments of a host and a storage module may include a host interface to communicate OOB signals with the host. As illustrated in FIG. 3, a storage module 300 of one embodiment may include a controller 310 and non-volatile memory 320. The controller 310 may include a processor 312 that is configured to control and manage storage of data in the storage module 300. Also, some configurations of the controller 310 may include internal memory 314, which may be separate from the non-volatile memory 320, and which the processor 312 may use to perform one or more functions or operations. For example, data may be temporarily stored in the internal memory 314 before being stored in the non-volatile memory 320 or sent to a host. In addition or alternatively, software and/or firmware including program instructions may be stored in the internal memory 314, which the processor 312 may execute to perform one or more functions.

In addition, the controller 310 may include a memory interface 316 that interfaces with the non-volatile memory 320. Also, the controller 310 may include a host interface 318 that configures the storage module 300 operatively in communication with a host. As used herein, the phrase "operatively in communication with" could mean directly in communication with or indirectly in communication with through one or more components, which may or may not be shown or described herein. The host interface 318 may communicate memory management commands from a host to the controller 310, and also communicate memory responses from the controller 310 to the host.

As shown in FIG. 4A, the storage module 300 shown in FIG. 3 may be embedded in a host 410 having a host controller 420. That is, the host 410 may embody the host controller 420 and the storage module 300, such that the host controller 420 interfaces with the embedded storage module 300 to manage its operations. For example, the storage module 300 can take the form of an iNAND™ eSD/eMMC embedded flash drive by SanDisk Corporation. The host controller 420 may interface with the embedded storage module 300 using the host interface 318. Additionally, when the storage module 300 is embedded in the host 410, some or all of the functions performed by the controller 310 in the storage module 300 may instead be performed by the host controller 420. The host 410 can take any form, such as, but not limited to, a solid state drive (SSD), a hybrid storage module (having both a hard disk drive and a solid state drive), a memory caching system, a mobile phone, a tablet computer, a digital media player, a game device, a personal digital assistant (PDA), a mobile (e.g., notebook, laptop) personal computer (PC), or a book reader, as examples. As shown in FIG. 4A, the host 410 can include optional other functionality modules 430. For example, if the host 410 is a mobile phone, the other functionality modules 430 can include hardware and/or software components to make and place telephone calls. As another example, if the host 410 has network connectivity capabilities, the other functionality modules 430 can include a network interface. Of course, these are just some examples, and other implementations can be used. Also, the host 410 can include other components (e.g., an audio output, input-output ports, etc.) that are not shown in FIG. 4A to simplify the drawing.

As shown in FIG. 4B, instead of being an embedded device in a host, the storage module 300 may have physical and electrical connectors that allow the storage module 300 to be removably connected to a host 440 (having a host controller 445) via mating connectors. As such, the storage module 300 may be a separate device from (and is not embedded in) the host 440. In this example, the storage module 300 can be a removable memory device, such as a Secure Digital (SD) memory card, a microSD memory card, a Compact Flash (CF) memory card, or a universal serial bus (USB) device (with a USB interface to the host), and the host 240 is a separate device, such as a mobile phone, a tablet computer, a digital media player, a game device, a personal digital assistant (PDA), a mobile (e.g., notebook, laptop) personal computer (PC), or a book reader, for example.

Figure 5:
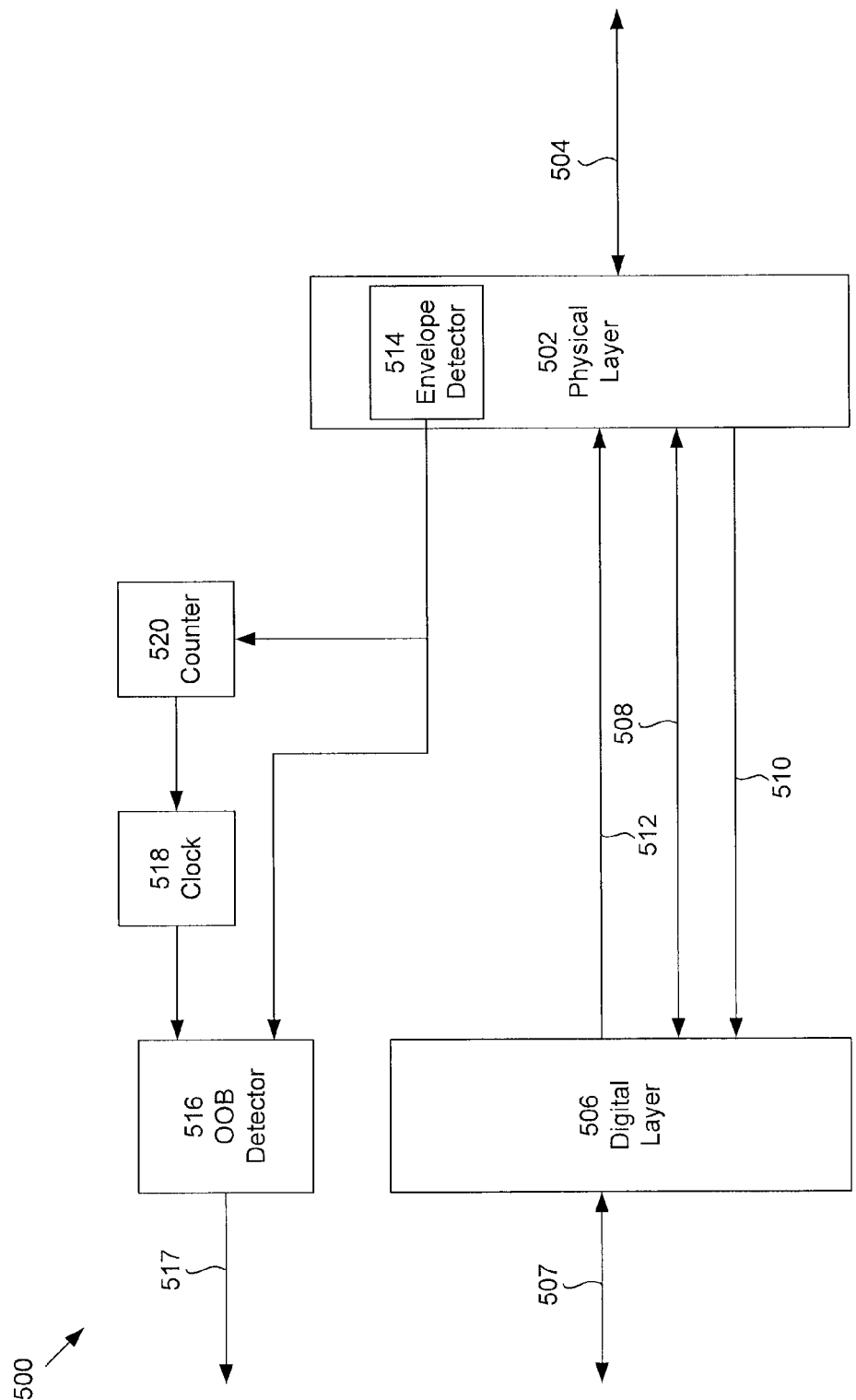
FIG. 5 is a block diagram of an example host interface for a storage module.

The storage module 300 may be in communication with the host controller 220 or the host 240 shown in FIGS. 2A and 2B via the host interface 318 shown in FIG. 3. FIG. 5 shows a block diagram of an example host interface 500 that may be used for the host interface 318 shown in FIGS. 3, 4A, and 4B.

The host interface 500 that may be configured to detect OOB signals received from a host and communicate the OOB signals or signals representative of the detected OOB signals to a processor that manages storage of data for a storage module. The host interface 500 may be configured to perform functions and/or handle information and received signals using and/or in accordance with various layers of the Open Systems Interconnection (OSI) model. In particular, the host interface 500 may include a physical layer (PHY) module 502 that communicates with the host and sends and receives information to and from the host over one or more communication links 504. Various information may be communicated between the host interface 500 and the host, such as OOB signals, data transfer commands (e.g., read and write commands), and data associated with the read and write commands. Other types of information may be communicated.

The host interface 500 may also include a digital layer module 506, which may include one or more non-physical layers, such as a data link layer, a network layer, a transport layer, or combinations thereof. The digital layer module 506 may communicate information with a processor of a storage module on communication link 507. In addition, the digital layer module 506 may communicate with the physical layer module 502 over one or more communication links, such as communication links 508-512 shown in FIG. 5. For example, the digital layer module 506 may communicate data and/or command information, such as read or write commands and associated data, over communication link 508. In addition, the physical layer module 502 may communicate clocking information to the digital layer module 506 over communication link 510, which may be extracted from signals received from the host. Also, the digital layer module 506 may communicate power mode information to the physical layer module 502 over communication link 512, which may instruct the physical layer module to activate or deactivate components of the physical layer of the host interface 500 in accordance with one or more high power modes or low power modes. Example power modes for SATA may include a ready mode in which the physical layer module 502 may be configured to be ready to send and receive data; a partial mode in which the physical layer module 502 is in a reduced power mode; and a slumber mode in which the physical layer module 502 is in a further reduced power mode.

Upon receipt of an OOB signal, the physical layer module 502 may be configured to generate a signal representative of the OOB signal. In some example configurations, the physical layer module 502 may include an envelope detector 514 that is configured to generate an envelope or an enveloped version of the OOB signal. The envelope of the OOB signal may track the burst and idle portions of the OOB signal. Over a burst period $T_B$ of a burst portion, the envelope may have a first logic level, and over an idle period of an idle portion, the envelope may have a second logic level. The first logic level may be a level that corresponds to a logic "high" and the second logic level may be a level that corresponds to a logic "low," although other types of logic levels may be used.

The envelope of the OOB signal, which may be referred to as an OOB detection signal, may be output by the envelope detector module 514 and sent to an OOB detector module 516. In response to receipt of the OOB detection signal, the OOB detector module 516 may be configured to detect that the physical layer module 502 received an OOB signal from the host and/or determine the type of the OOB signal that the physical layer module 502 received (e.g., a COMWAKE or COMRESET). To make the determinations, the OOB detector module 506 may be configured to process and/or take various measurements of the OOB detection signal. For example, the OOB detector module 516 may be configured to determine whether the OOB detection signal is at the first logic level or the second logic level, the time durations over which the OOB detection signal is at the first or second logic levels, and/or the number of times that the OOB detection signal transitions between the first logic level and the second logic level. From these measurements, the OOB detector module 516 may determine the time periods of the burst and idle portions and the number of burst portions in order to identify that the received OOB detection signal is representative of an OOB signal and the type of OOB signal that the OOB detection signal represents.

To illustrate, the physical layer module 502 may receive a COMWAKE signal, and in response, the envelope detector module 514 may generate an envelope of the COMWAKE signal and send the envelope as an OOB detection signal to the OOB detector module 516. The OOB detector module 516 may determine whether the OOB detection signal is at a logic "high" or logic "low" level to determine the burst and idle portions of the COMWAKE signal, the time durations that the OOB detection signal is at the logic "high" and logic "low" levels to determine the burst and idle time periods of the burst and idle portions, respectively, and the transitions from the logic "high" to logic "low" levels to determine the number of burst portions and/or the number of idle portions of the COMWAKE signal. From these determinations, the OOB detector module 516 may determine that the signal received by physical layer module 502 is an OOB signal, and in particular a COMWAKE signal.

In response to determining that the signal received is an OOB signal, the OOB detector module 516 may generate a corresponding signal that corresponds to the OOB signal received by the physical layer module 502. For example, the OOB detector module 516 may generate the OOB signal or some other signal indicative of receipt of the OOB signal. To illustrate, using the example above, upon detection of the COMWAKE signal, the OOB detector module 516 may generate a COMWAKE signal or some other signal indicative of the COMWAKE signal that was received by the physical layer module 502. The OOB detector module 516 may then send the corresponding signal to a processor of a storage module on communication link 517 for further processing.

The OOB detector module 516 may use clocking or a clock signal to determine whether the OOB detection signal is representative of an OOB signal and/or the type of OOB signal that it represents. For example, the OOB detector module 516 may take samples of the OOB detection signal using the clock signal and perform the various measurements of the OOB detection signal using the samples. Alternatively, without use of clocking or receipt of the clock signal, the OOB detector module 516 may be unable to determine whether a received OOB detection signal is representative of an OOB signal and/or the type of OOB signal that it represents.

The OOB detector module may be configured to receive the clock signal from a clock generator module 518. In turn, the clock generator module 518 may be controlled by a counter module 520. In particular, the counter module 520 may generate and output a control signal to the clock generator module 518, which may activate or deactivate the clock generator module 518. When the clock generator module 518 is activated by the control signal, the clock generator module 518 may be configured to output the clock signal to the OOB detector 516. Alternatively, when the clock generator module 518 is deactivated by the control signal, the clock generator module 518 may be configured to withhold or cease output of the clock signal to the OOB detector module 516.

The counter module 520 may be configured to activate or deactivate the clock generator module 518 based on whether an OOB signal is received by the physical layer module 502. That is, when the physical layer module 502 receives an OOB signal, the counter module 520 may detect a presence of the OOB signal. In response, the counter module 520 may activate the clock generator module 518. Alternatively, when no OOB signal is received by the physical layer module 502, the counter module 520 may detect an absence of OOB signals. In response to detection that no OOB signals are received, the counter module 520 may be configured to wait a predetermined time period before deactivating the clock generator module 518. Once the predetermined time period elapses, the counter module 520 may deactivate the clock generator module 518.

In an example configuration, upon detection of an absence of OOB signals received by the physical layer module 502, the counter module 520 may abstain from deactivating the clock generator module 518 and begin counting from an initial value to a final value. While the counter module 520 is counting, if an OOB signal is received by the physical layer module 502, the counter module 520 may detect a presence of the OOB signal and stop counting without deactivating the clock module 518. Alternatively, if the counter module 520 reaches the final value without detecting the presence of an OOB signal, then the counter module 520 may deactivate the clock generator module 518.

In one example configuration as shown in FIG. 5, when an OOB signal is received, the envelope detector module 514 may send the OOB detection signal to the counter module 520, in addition to the OOB detector module 516, in order for the counter module 520 to detect the presence or absence of OOB signals being received by the physical layer module 502. Upon receipt of the OOB detection signal, the counter module 520 may detect an initial transition from the second logic level (e.g., logic "low") to the first logic level (e.g., logic "high"), which may indicate a burst portion of the OOB signal. Upon detection of the initial transition, if the clock generator module 518 is deactivated, then the counter module 520 may activate the clock generator module 518. Alternatively, if the clock generator module 518 is activated and the counter module 520 is in the process of counting, then the counter module 520 may stop counting without deactivating or maintain activation of the clock generator module 518.

In addition, after the transition from the second logic level to the first logic level, the counter module 520 may detect a transition from the first logic level to the second logic level, indicating the start of an idle period of an idle portion. Upon detection of this transition, the counter module 520 may start a timer or begin counting. The time period that the counter module 520 waits or takes to count from the initial value to the final value may be greater than an idle period of an idle portion associated with any type of OOB signal. In this way, a next burst portion will occur before the time period elapses or the counter reaches the final value, and deactivation of the clock generator module 518 in between consecutive burst portions may be avoided. Alternatively, after a last burst portion of an OOB signal and if no OOB signals are further received before the expiration of the time period, when the final value is reached, the counter module 520 may deactivate the clock generator module 518.

Figure 6:
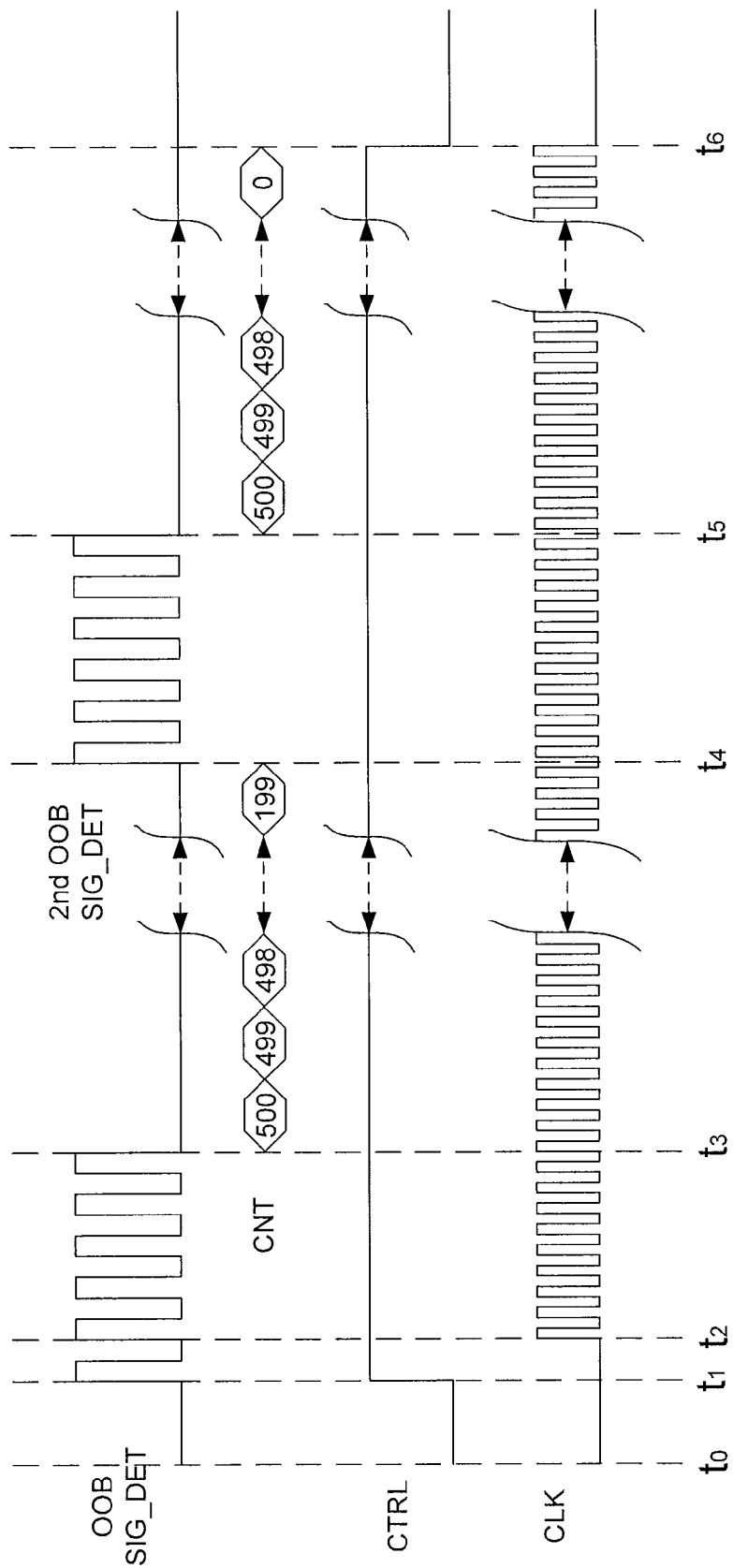
FIG. 6 is a timing diagram of signals generated in response to receipt of an OOB signal.

FIG. 6 shows plots as a function of time of an example OOB detection signal (OOB SIG_DET), a counting signal CNT generated by the counter module 520 during periods of inactivity, a control signal CTRL used to control activation and deactivation of the clock generator module 518, and the clock signal CLK generated by the clock generator module 518. The plots shown in FIG. 6 illustrate various example times at which an OOB signal may be received by the physical layer module 502, and the various signals that may be generated when the OOB signal is received in order to detect receipt of the OOB signal.

At an initial time $t_0$, the clock generator module 518 may be deactivated, which may be in response to the control signal CTRL generated by the counter module 520 being at a logic "low" level. Accordingly, no clock signal is being output by the clock generator 518 at the time $t_0$.

At time $t_1$, an OOB signal may be received by the physical layer module 502, and a corresponding OOB detection signal OOB SIG_DET may be output to the counter module 520 and the OOB detector module 516. As shown in FIG. 6, the OOB SIG_DET signal is logic "high" during the burst portions and logic "low" during the idle portions. For clarity, the counter signal CNT is not shown counting during the idle portions of the OOB SIG_DET signal. Also, at time $t_1$, upon receipt of the OOB SIG_DET signal, the counter module 520 may output a control signal CTRL (or change the logic level of the control signal CTRL) to activate the clock generator module 518.

At time $t_2$, the clock generator module 518 may begin outputting the clock signal CLK. The time period between time $t_1$ and time $t_2$ exemplifies an inherent delay or lag time in generation of the clock signal CLK that may exist between activation of the clock generator module 518 and an actual output time of the clock signal CLK. However, the delay may be short enough to enable to OOB detector module 516 to detect a minimum number of burst portions in order to detect receipt of the OOB signal. For example, under SATA, a minimum detection of four bursts may be needed in order for an OOB detector configured in accordance with SATA to detect receipt of an OOB signal and identify the type of the OOB signal. Accordingly, the OOB detector module 516 shown in FIG. 5 may detect a minimum of four bursts in order to detect an OOB signal and identify the type of the OOB signal.

At time $t_3$, a sixth or last burst portion of the OOB signal may be received, and a corresponding final transition from a logic "high" level to a logic "low" level of the OOB detection signal OOB SIG_DET may be detected by the counter module 520. At this time, the counter module 520 may begin counting from an initial value to a final value. In the example shown in FIG. 6, the counter module 520 may be configured to decrementally count from an initial value to a final value. The initial value shown in FIG. 4 is 500 and the final value is zero, although other initial and final values may be used. In alternative examples, the counter may incrementally count, or the counter may count an identified number of times in some combination of increments and decrements. Various counting configurations in order for the counter module 520 to wait for a predetermined amount of time before deactivating the clock generator module 518 may be possible.

At time $t_4$, the physical layer module 502 may receive a second or next OOB signal, and a corresponding signal detection signal OOB SIG_DET may be sent to the counter module 520 and the OOB detector module 516. As shown in FIG. 6, from the time $t_3$ to the time $t_4$, the counter module 520 counted from 500 to 199. Because the counter module 520 did not reach the final value of zero during this time period, the control signal CTRL remained at a logic "high" value and the clock generator module 518 remained activated from time $t_3$ to time $t_4$. As such, at time $t_4$, when the second OOB detection signal OOB SIG_DET was received by the counter module 520, the clock generator module 518 was already activated and clock signal was being output.

At time $t_5$, like at time $t_3$, a sixth or last burst portion of the second OOB signal may be received, and a corresponding final transition from a logic "high" level to a logic "low" level of the second OOB detection signal OOB SIG_DET may be detected by the counter module 520. At this time, the counter module 520 may begin counting down from the initial value 500. At time $t_6$, the counter module 520 may count to the final value of zero without detecting another OOB detection signal. When the counter module 520 reaches zero, the counter module 520 may cease output or drop the logic level of the control CTRL to a logic "low," which may deactivate the clock generator module 518 and the clock signal CLK may cease being output.

As previously described, the host interface 500 may be configured to operate in various power modes, such as ready, partial, and slumber. During the slumber power mode, clock generators associated with the physical layer module 502 and/or the digital layer module 506 may be deactivated. When an OOB signal is received by the physical layer module 502 when the host interface 500 is in slumber mode, if a clock generator used to detect the OOB signal is deactivated, a delay in generation and output of clock signals to detect the OOB signal may take too long, resulting in the OOB signal being undetected. One solution may be to use a clock generator that is always active, regardless of whether the host interface 500 is in slumber mode, in order to ensure that a received OOB signal is detected. However, always having a clock generator activated requires increased power consumption, which may be undesirable for low power modes such as slumber mode.

In contrast to using a clock generator that is always active to detect OOB signals, the host interface 500 uses the counter module 520 to control activation and deactivation of the clock generator module 518, and in particular to wait for a limited or discrete period of time before deactivating the clock generator module 518. By configuring the counter module 520 to wait a predetermined period of time before deactivating the clock generator module 518, a grace period may be established in which the clock generator 518 may remain active or enabled while other or remaining components of the host interface 500 deactivate when the host interface 500 transitions to a low power state, such as slumber mode. Then, after a predetermined period of time elapses without receipt of any OOB signals, the clock generator module 518 is deactivated, which consumes less power and is thus more desirable than always-active clock generators for lower power states such as slumber mode. Also, by receiving the OOB detection signal when the physical layer module 502 receives a corresponding OOB signal, the counter module 520 may provide relatively quick activation of the clock generator module 518 so that the OOB detector module 516 detects at least the minimum number of burst portions (e.g., four) of the received OOB signal, even if the clock generator module 518 was deactivated at the time of receipt of the OOB signal by the physical layer module 502. In this way, OOB signal detection may be achieved with enhanced power savings.

Figure 7:
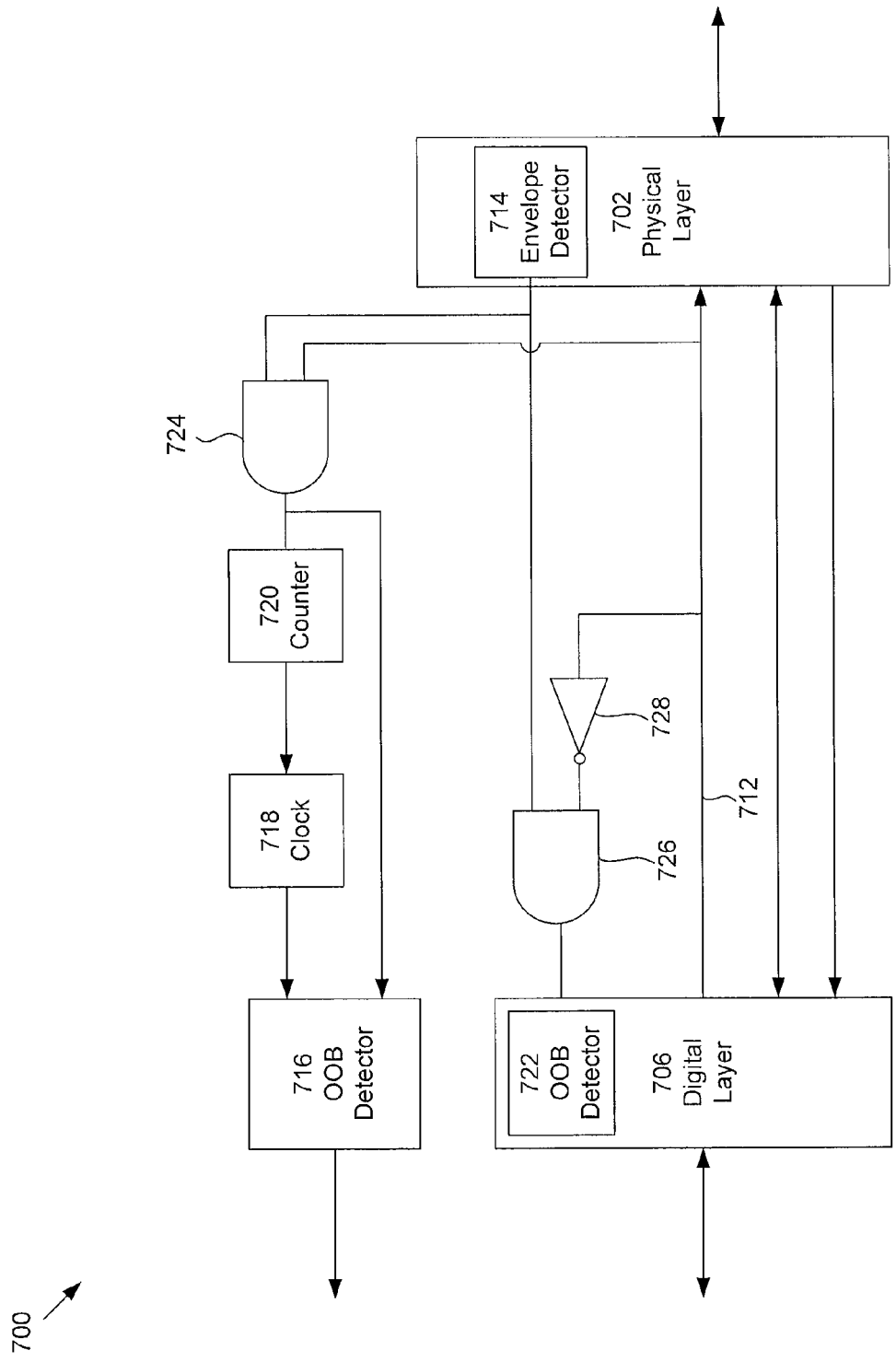
FIG. 7 is a block diagram of another example host interface for a storage module.

FIG. 7 shows another example host interface 700 that may be used for the host interface 318 shown in FIGS. 3, 4A, 4B. The host interface 700 may be configured to detect OOB signals received from a host and communicate the OOB signals or signals representative of the detected OOB signals to a processor that controls and manages the storage of data, such as the processor 312 shown in FIG. 3. The alternative example host interface 700 may be similar to the example host interface shown in FIG. 5, except that the host interface 700 may include two OOB detector modules—an OOB detector module 722 that is part of a digital layer module 706 and an auxiliary OOB detector module 716. The auxiliary OOB detector module 716 may be similar to the OOB detector module 516 shown in FIG. 5 in that it is receives a clock signal from a clock generator module 718 that is controlled by a counter module 720.

In addition to the OOB detector module 722, the host interface 700 may include logic circuitry that may be configured to control communication of OOB detection signals to the OOB detector module 722 and the auxiliary OOB detector module 716 depending on the power mode of the host interface 700. In particular, when the host interface 700 is in a low power mode, the logic circuitry may enable use of the auxiliary OOB detector module 716, the clock generator module 718, and the counter module 720 to detect receipt of an OOB signal. In addition, when the host interface 700 is in the low power mode, the logic circuitry may prevent the OOB detector module 722 from detecting a received OOB signal. Alternatively, when the host interface 700 is in a high power mode, the logic circuitry may prevent use of the auxiliary OOB detector module 716, the clock generator module 718, and the counter module 720 to detect receipt of an OOB signal. In addition, when the host interface 700 is in a high power mode, the logic circuitry may enable the OOB detector module 722 to detect a received OOB signal.

In general, high and low power modes may be determined or identified based on power consumption and/or an amount of electronic components of the host interface 700 being activated to consume power. At a minimum, a high power mode may include a highest power mode where a maximum number of components are activated or where power consumption by these components is at a maximum, and a low power mode may include a lowest power mode where a minimum number of components are activated or where power consumption is at a minimum. High power or low power modes may also include other power modes where the number of components being activated is in between maximum and minimum amounts, or where power consumption is in between maximum and minimum levels. These other power modes may identified as being partially-high or partially-low power modes. Partially-high or partially-low power modes may be considered power modes separate from high or low power modes. Alternatively, these partially-high or partially-low power modes may be considered part of high power modes or low power modes, depending on the application and/or the number of power modes for a particular application. For example, a low power mode may include only the lowest power mode or it may generally include power modes other than the highest power mode. Similarly, a high power mode may include only the highest power mode, or it may generally include power modes other than the lowest power mode.

For some example configurations, low and high power modes may be determined or identified in accordance with SATA. For example, the SATA ready power mode may be a high power mode, and the SATA slumber mode may be a low power mode. The SATA partial mode may be a considered a high power mode, a low power mode, or its own power mode that is considered neither high nor low.

In the example configuration shown in FIG. 7, the logic circuitry may include AND gate circuitry 724 configured to perform AND logic operations. The AND gate circuitry 724 may include a first input configured to receive an OOB detection signal from an envelope detector module 714 of a physical layer interface module 702. In addition, the AND gate circuitry 724 may include a second input in communication with communication link 712, which may be used to communicate low power mode information from the digital layer module 706 to the physical layer module 702. When the digital layer module 706 wants to instruct the physical layer module 702 to enter a low power mode, the digital layer module 706 may output a low-power mode signal with at a logic "high" level. The AND gate circuitry 724 may receive the logic "high" low-power mode signal, and when it does, the AND gate circuitry 724 may pass any received OOB detection signals to the counter module 720 and the auxiliary detector module 716, which may enable detection of OOB signals using the auxiliary OOB detector module 716 when the host interface 700 is in the low power mode. Alternatively, when the host interface 700 is not in the low power mode, a logic "low" low-power mode signal may be received by the AND gate circuitry 724 from the communication link 712. When the AND gate circuitry 724 receives the logic "low" low-power mode signal, the AND gate circuitry 724 may withhold passing any received OOB detection signals to the counter module 720 and the auxiliary OOB detector module 716, disabling the auxiliary OOB detector module 716 from detecting received OOB signals when the host interface 700 is not in the low power mode.

In alternative example configurations, the AND gate circuitry 724 may be configured to withhold passing a received OOB detection signal to only one of the auxiliary OOB detector module 716 or the counter module 720 when the host interface 700 is not in the low power mode. For example, the envelope detector 714 may always send an OOB detection signal to the auxiliary OOB detector module 716 regardless of the whether the host interface 700 is in the low power mode, but the counter module 720 may only receive the OOB detection signal when the host interface 700 is in the low power mode. Alternatively, the counter module 700 may always receive an OOB detection signal regardless of whether the host interface 700 is in the lower mode, but the auxiliary OOB detector module 716 may only receive an OOB detection signal when the host interface 700 is in the low power mode.

Additionally, the logic circuitry may include AND gate logic circuitry 726 and inverse logic circuitry 728. As shown in FIG. 7, the AND gate logic circuitry 726 may include a first input configured to receive an OOB detection signal from the envelope detector module 714, and a second input configured to receive an output signal from the inverse logic circuitry 728. The inverse logic circuitry 728 may be in communication with the communication link 712. When the digital layer module 706 wants to instruct the physical layer module 702 to enter the low power mode, the inverse logic circuitry 728 may receive the logic "high" low-power mode signal and invert it to a logic "low" level, which may be received by the AND gate logic circuitry 726. Because the output signal from the inverse logic circuitry 728 is at logic "low," any OOB detection signal received by the AND gate logic circuitry 726 may not be passed to the OOB detector module 722 of the digital layer 706. In this way, OOB detection signals may be prevented from being received by the OOB detector module 722 of the digital layer module 706 when the host interface 700 is in low power mode.

Alternatively, when the digital layer module 706 does not instruct the physical layer module 706 to enter the low power mode, the inverse logic circuitry 728 may receive a logic "low" low-power mode signal and invert the logic "low" signal to a logic "high" signal, which may be received by the AND gate logic circuitry 726. Because the output signal from the inverse logic circuitry 728 is at a logic "high," any OOB detection signal received by the AND gate logic circuitry 726 may be passed to the OOB detector module 722 of the digital layer module 706. In this way, OOB detection signals may be sent to the OOB detector module 722 of the digital layer module 706 when the host interface 700 is not in the low power mode.

Referring to FIGS. 5 and 7, each of the various modules, components, and circuits of the host interfaces 500 and 700 shown in FIGS. 5 and 7, may implemented in and configured to perform their functions using one or more various types of hardware or hardware electronic circuits, including but not limited to analog electronic circuitry, digital electronic circuitry such as hardware logic, or combinations thereof. Also, the various modules, components, and circuits of the host interfaces 500, 700 may be implemented in integrated circuits (IC), such application specific integrated circuits or field programmable gate arrays, as examples. Additionally, the host interfaces 500, 700 shown in FIGS. 5 and 7 may take any suitable form or configuration, such as, but not limited to, an eMMC host interface, a UFS interface, or a USB interface, as examples.

Figure 8:
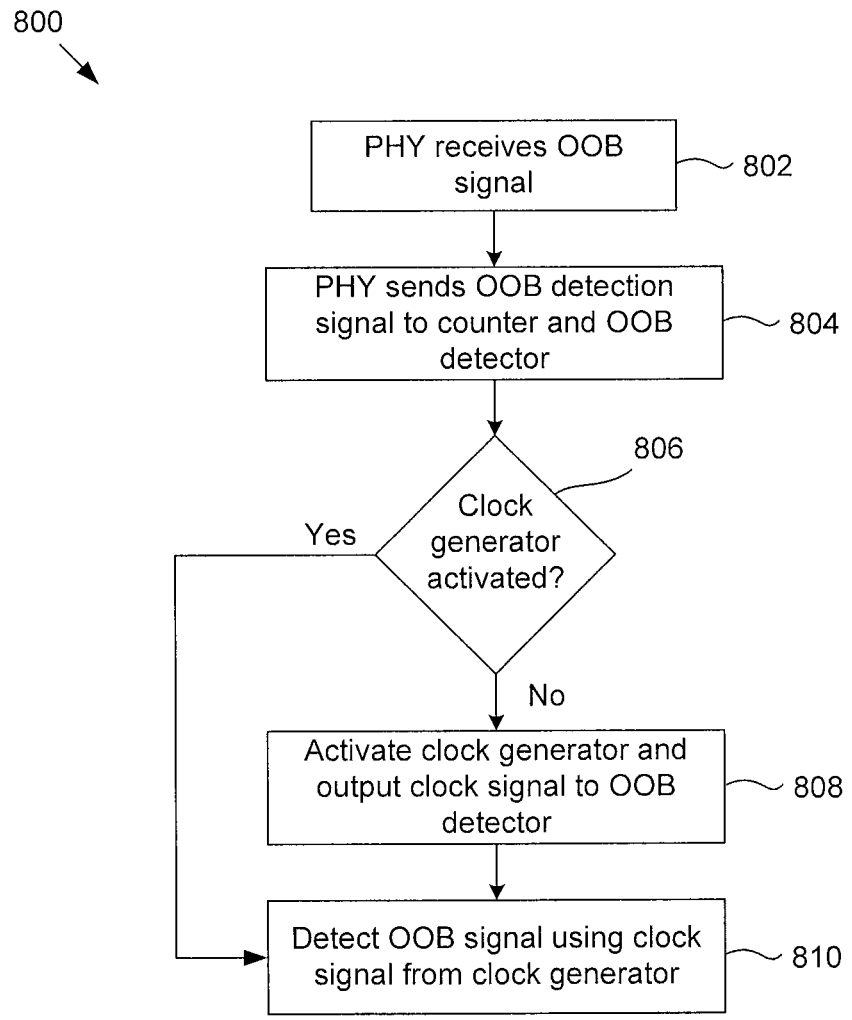
FIG. 8 is a flow chart of an example method of detecting a received OOB signal by a host interface for a data storage module.

FIG. 8 shows a flow chart of an example method of detecting a received OOB signal by a host interface for a data storage module. At block 802, a physical layer of the host interface may receive an OOB signal. At block 804, the physical layer may send an OOB detection signal to a counter and an OOB detector of the host interface. The OOB detection signal may be an envelope of the OOB signal generated using an envelope detector. At block 806, upon receiving the OOB detection signal, if a clock generator of the host interface is not activated, then at block 808, the counter may activate the clock generator, causing the clock generator to send a clock signal to the OOB detector. At block 810, the OOB detector, upon receipt of the clock signal and the OOB detection signal, may detect the OOB signal received by the physical layer and determine the type of the OOB signal. Also at block 810, the OOB detector may generate a corresponding OOB signal and send the OOB signal to a processor of the storage module. Referring back to block 806, if, alternatively, the host interface is already activated, then the method may proceed directly to block 810.

Figure 9:
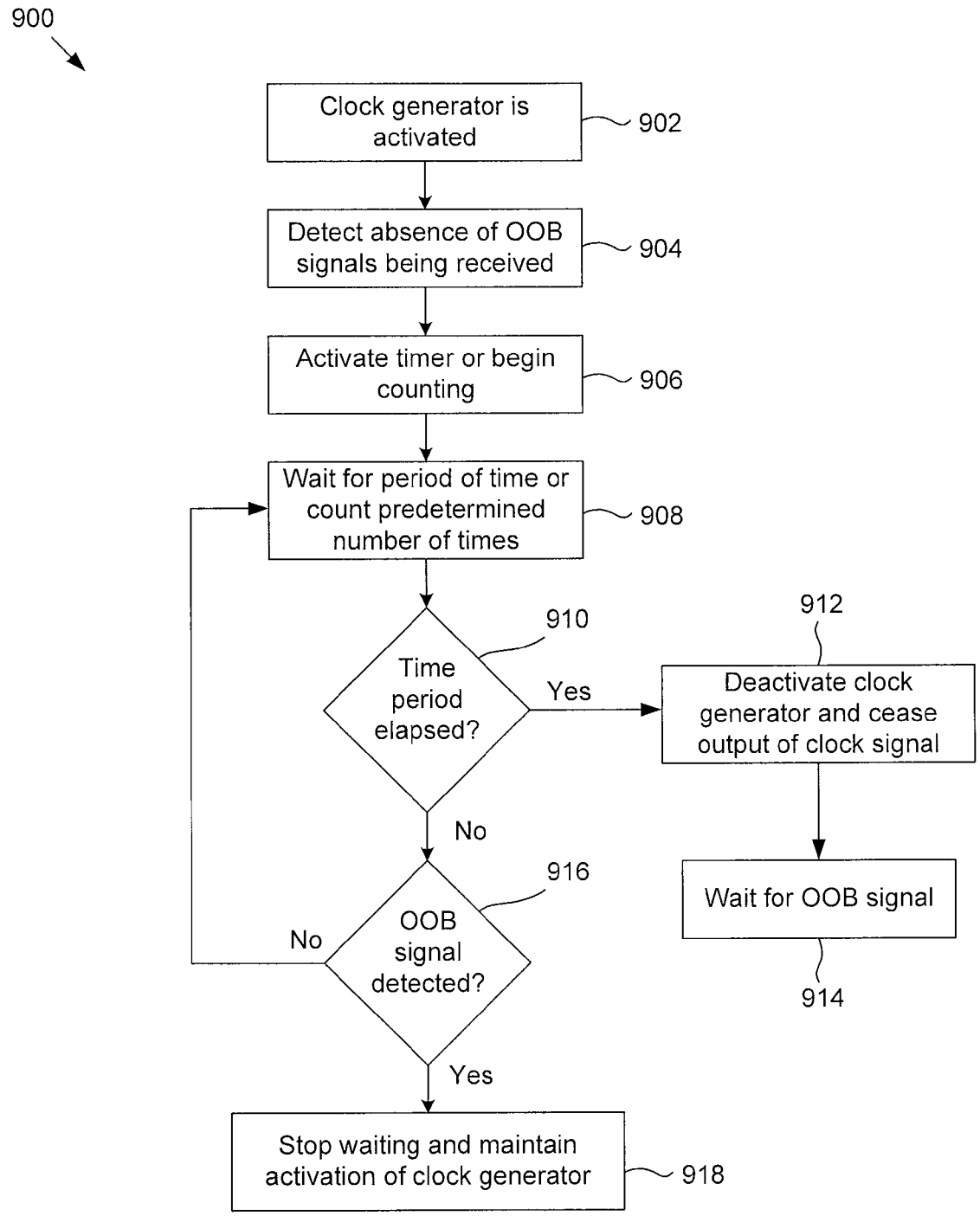
FIG. 9 is a flow chart of an example method of controlling a clock generator of a host interface to detect OOB signals.

FIG. 9 shows a flow chart of an example method of controlling a clock generator of a host interface to detect OOB signals. At block 902, the clock generator may be activated, generating and outputting a clock signal to an OOB detector for use in detecting OOB signals. At block 904, a counter may detect an absence of an OOB signal being received by a physical layer of the host interface. For example, the counter may detect a transition of a received OOB detection signal from a logic "high" level to a logic "low" level or detect an inactivity of OOB detection signals being received from the physical layer. At block 906, upon detection of an absence of an OOB signal being received by the physical layer, the counter may activate a timer or begin counting. At block 908, the counter may wait a predetermined period of time that was started when the counter activated the timer or began counting. In some examples, the period of time may be determined by the time the counter takes to count from an initial value to a final value.

At block 910, the counter may determine whether the period of time has elapsed. If the counter is counting during the period of time, then the period of time may elapse when the counter reaches the final value. If the period of time has elapsed, then at block 912, the counter may activate the clock generator, and the clock generator may cease output of the clock signal. At block 914, the counter may be idle and wait for another OOB signal to be received by the physical layer.

Referring back to block 910, if, alternatively, the period of time has not yet elapsed, then at block 916, the counter may detect whether an OOB signal has been received by the physical layer. The counter may detect that an OOB signal is received by detecting a transition from a logic "low" level to a logic "high" level of an OOB detection signal received from the physical layer. If an OOB signal is not detected by the counter, then the method 900 may proceed back to block 908, where the counter may continue to wait for the predetermined period of time. Alternatively, at block 916, if an OOB signal is detected, then at block 918, the counter may stop waiting and maintain activation of the clock generator.

In some examples, to stop waiting, the counter may stop counting and/or reset the count value and/or the time period to an initial value for a next counting sequence. In addition, at block 918, the OOD detector may detect the received OOB signal and the OOB signal's type using the clock signal received from the clock generator.

Figure 10:
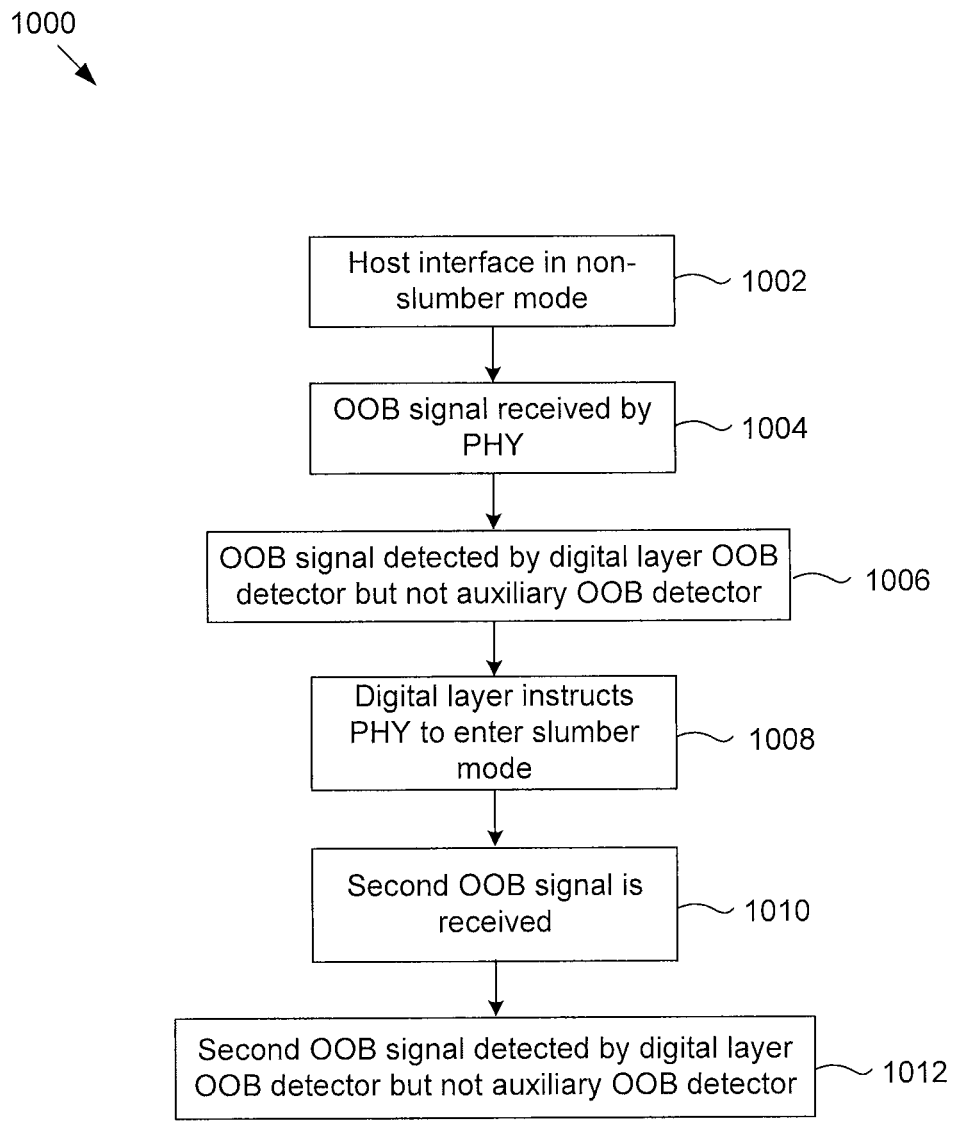
FIG. 10 is a flow diagram of an example method 800 of controlling detection of received OOB signals by a plurality of OOB detectors of a host interface for a storage module.

FIG. 10 shows a flow diagram of an example method 1000 of controlling detection of received OOB signals by a plurality of OOB detectors of a host interface for a storage module. At block 1002, the host interface may be in a non-low power mode, such as a ready mode. At block 1004, an OOB signal may be received by a physical layer of the host interface. At block 1006, in response to the host interface being in a non-low power mode, an OOB detector that is part of a digital layer of the host interface may detect receipt of the OOB signal and identify a type of the OOB signal. Also, at block 1006, an auxiliary OOB detector that is external to the digital layer may not detect receipt of the OOB signal. For example, logic circuitry of the host interface may send an OOB detection signal to the OOB detector of the digital layer, but may withhold sending the OOB detection signal to the auxiliary OOB detector and/or may prevent the auxiliary OOB detector from processing the OOB detection signal using a clock signal. In addition, at block 1006, after detecting the OOB signal, the OOB detector of the digital layer may send a corresponding OOB signal or information representative of the OOB signal downstream to a processor of the storage module.

At block 1008, the digital layer may instruct the physical layer to enter a low power mode, such as a slumber mode. At block 1010, a second OOB signal may be received. At block 1012, in response to the host interface being in the low power mode, the auxiliary OOB detector may detect receipt of the second OOB signal and identify a type of the second OOB signal. Also, at block 1012, the OOB detector that is part of the digital layer may not detect receipt of the OOB signal. For example, the logic circuitry may enable the auxiliary OOB detector to receive both an OOB detection signal and a clock signal to detect the OOB signal, but may prevent the OOB detector of the digital layer from receiving the OOB detection signal. In addition, at block 1012, after detecting the OOB signal, the auxiliary OOB detector may send a corresponding OOB signal or information representative of the OOB signal downstream to the processor of the storage module.

It is intended that the foregoing detailed description be understood as an illustration of selected forms that the embodiments can take and does not intend to limit the claims that follow. Also, some of the following claims may state that a component is operative to perform a certain function or configured for a certain task. It should be noted that these are not restrictive limitations. It should also be noted that the acts recited in the claims can be performed in any order—not necessarily in the order in which they are recited. Additionally, any aspect of any of the preferred embodiments described herein can be used alone or in combination with one another. In sum, although the present invention has been described in considerable detail with reference to certain embodiments thereof, other versions are possible. Therefore, the spirit and scope of the appended claims should not be limited to the description of the embodiments contained herein.

We claim:

1. An interface comprising:
  a counter module configured to:
    detect whether an out-of-band (OOB) signal is received by a physical layer of the interface;
    in response to detection of a presence of the OOB signal, send a control signal to activate or maintain activation of a clock generator, the clock generator configured to output a clock signal in response to being activated for detection of the OOB signal, wherein the clock generator is configured to generate the clock signal based on receipt of a single signal, the single signal being the control signal received from the counter module;
    in response to detection of an absence of the OOB signal, wait for a predetermined time period before deactivating the clock generator of the interface, the clock generator configured to cease output of the clock signal in response to being deactivated; and
  an OOB detector module configured to detect receipt of the OOB signal using the clock signal received by the clock generator.

2. The interface of claim 1, wherein the counter module is further configured to:
  determine that the predetermined time period has elapsed; and
  deactivate the clock generator in response to the time period having elapsed.

3. The interface of claim 2, wherein the counter module is configured to count to a final value during the predetermined time period to determine when the predetermined time period elapses.

4. The interface of claim 1, wherein the counter module is further configured to:
  while waiting during the predetermined period of time, detect that the OOB signal is received by the physical layer; and
  in response to detection of the OOB signal received by the physical layer, cease waiting and maintain activation of the clock generator.

5. The interface of claim 1, wherein the counter module is configured to receive an OOB detection signal from the physical layer to detect that the OOB signal is received by the physical layer, wherein the OOB detection signal is an envelope of the OOB signal.

6. The interface of claim 5, wherein the counter module is further configured to, in response to receipt of the OOB detection signal, identify a transition from a first logic level to a second logic level of the OOB detection signal to detect that the OOB signal is received by the physical layer.

7. The interface of claim 6, wherein the counter module is further configured to, in response to receipt of the OOB detection signal, identify a transition from the second logic level to the first logic level of the OOB detection signal to detect an absence of a next OOB signal.

8. The interface of claim 1, wherein the predetermined time period is greater than an idle time period associated with an idle portion of the OOB signal.

9. The interface of claim 1, wherein the OOB detector module comprises a first OOB detector module, and wherein the interface further comprises a second OOB detector module, the second OOB detector module being implemented in a digital layer of the interface,
  wherein the first OOB detector module is configured to detect the OOB signal when the interface is in a low power mode; and
  wherein the second OOB detector module is configured to detect the OOB signal when the interface is in a non-low power mode.

10. The interface of claim 1, further comprising:
logic circuitry configured to:
allow receipt of the OOB signal by at least one of the counter module or the OOB detector module when the interface is in a low power mode; and
prevent receipt of the OOB signal by the at least one of the counter module or the OOB detector module when the interface is in a non-low power mode.

11. A method of detecting out-of-band (OOB) signals with an interface, the method comprising:
receiving, with a physical layer of the interface, a first OOB signal;
detecting, with a counter of the interface, receipt of the first OOB signal by the physical layer;
activating, with the counter, a clock generator by sending a control signal to the clock generator in response to detecting receipt of the first OOB signal;
in response to being activated, generating and outputting, with the clock generator, a clock signal based on receipt of a single signal, the single signal being the control signal received from the counter;
detecting, with an OOB detector, receipt of the first OOB signal using the clock signal being output by the clock generator;
detecting, with the counter, an absence of a second OOB signal received by the physical layer; and
in response to detecting the absence of the second OOB signal, waiting, with the counter, a predetermined time period before deactivating the clock generator.

12. The method of claim 11, further comprising:
deactivating, with the counter, the clock generator when the predetermined time period elapses.

13. The method of claim 11, further comprising:
counting, with the counter, a predetermined number of times during the predetermined time period before deactivating the clock generator.

14. The method of claim 11, further comprising:
while waiting during the predetermined time period, detecting, with the counter, receipt of the second OOB signal by the physical layer; and
in response to detecting receipt of the second OOB signal, resetting, with the counter, the predetermined time period and maintaining activation of the clock generator.

15. The method of claim 11, further comprising:
receiving, with the counter, an OOB detection signal from the physical layer, wherein the OOB detection signal is an envelope of the first OOB signal; and
identifying, with the counter, an initial transition from a first logic level to a second logic level of the OOB detection signal to detect receipt of the first OOB signal by the physical layer.

16. The method of claim 15, further comprising
identifying, with the counter, a last transition from the second logic level to the first logic level of the OOB detection signal to detect the absence of the second OOB signal.

17. The method of claim 11, wherein the OOB detector comprises a first OOB detector, the method further comprising:
detecting, with the first OOB detector, the first OOB signal when the interface is in a low power mode; and
detecting, with a second OOB detector of a digital layer of the interface, the first OOB signal when the interface is in a non-low power mode.

18. A method of detecting out-of-band (OOB) signals with an interface, the method comprising:
detecting, with a counter of the interface, an OOB signal being received by a physical layer of the interface;
activating, with the counter, a clock generator by sending a control signal in response to detecting the OOB signal;
in response to being activated, generating and outputting, with the clock generator, a clock signal based on receipt of a single signal, the single signal being the control signal received from the counter;
detecting, with an OOB detector, the OOB signal received by the physical layer using the clock signal; and
maintaining, with the counter, activation of the clock generator for a predetermined period of time after a last burst portion of the OOB signal is detected before deactivating the clock generator.

19. The method of claim 18, further comprising:
deactivating, with the counter, the clock generator when the predetermined time period elapses.

20. The method of claim 19, further comprising:
receiving, with the counter, an OOB detection signal from the physical layer, wherein the OOB detection signal is an envelope of the first OOB signal; and
identifying, with the counter, an initial transition from a first logic level to a second logic level of the OOB detection signal to detect receipt of the first OOB signal by the physical layer.

21. The method of claim 18, further comprising:
counting, with the counter, from an initial value to a final value during the predetermined time period before deactivating the clock generator.

* * * * *